(12) United States Patent
Uemura et al.

(10) Patent No.: US 11,012,011 B2
(45) Date of Patent: May 18, 2021

(54) MOTOR CONTROL DEVICE AND AIR CONDITIONER

(71) Applicant: Mitsubishi Electric Corporation, Tokyo (JP)

(72) Inventors: Keisuke Uemura, Tokyo (JP); Kenji Takahashi, Tokyo (JP); Yasuhiko Wada, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/487,677

(22) PCT Filed: Apr. 27, 2017

(86) PCT No.: PCT/JP2017/016829
§ 371 (c)(1),
(2) Date: Aug. 21, 2019

(87) PCT Pub. No.: WO2018/198289
PCT Pub. Date: Nov. 1, 2018

(65) Prior Publication Data
US 2020/0059173 A1 Feb. 20, 2020

(51) Int. Cl.
*H02P 5/50* (2016.01)
*H02P 21/22* (2016.01)

(52) U.S. Cl.
CPC .............. *H02P 5/50* (2013.01); *H02P 21/22* (2016.02)

(58) Field of Classification Search
CPC .. H02P 29/027; H02P 6/18; H02P 6/20; H02P 5/74; H02P 21/22; H02P 5/50
See application file for complete search history.

(56) References Cited

U.S. PATENT DOCUMENTS

| | | | |
|---|---|---|---|
| 7,764,029 B2 * | 7/2010 | Buente | H02P 3/04 318/105 |
| 7,791,309 B2 * | 9/2010 | Hwang | H02P 6/20 318/807 |

(Continued)

FOREIGN PATENT DOCUMENTS

| | | |
|---|---|---|
| EP | 3 091 653 A1 | 11/2016 |
| JP | 2003-116293 A | 4/2003 |

(Continued)

OTHER PUBLICATIONS

Extended European Search Report dated Mar. 6, 2020 issued in corresponding EP patent application No. 17907689.8.

(Continued)

*Primary Examiner* — Rina I Duda
(74) *Attorney, Agent, or Firm* — Posz Law Group, PLC (57) ABSTRACT

A motor control device includes an inverter configured by a plurality of arms, a smoothing unit supplying a direct-current voltage to the inverter, a shunt resistor inserted between a lower-arm switching element for each phase of the inverter and a negative-electrode side of the smoothing unit, a master motor current sensor outputting a voltage according to a current flowing in a first motor connected in parallel to the inverter, and a computing unit generating driving signals for a plurality of switching elements based on an output of the master motor current sensor and an output corresponding to a voltage drop on the shunt resistor.

14 Claims, 7 Drawing Sheets

(56) References Cited

U.S. PATENT DOCUMENTS

| | | | | |
|---|---|---|---|---|
| 8,138,711 | B2* | 3/2012 | Hwang | F24F 11/70 |
| | | | | 318/807 |
| 8,508,166 | B2* | 8/2013 | Marcinkiewicz ... | H02M 1/4225 |
| | | | | 318/438 |
| 2010/0315024 | A1* | 12/2010 | Najima | H02M 7/53871 |
| | | | | 318/139 |
| 2012/0074885 | A1* | 3/2012 | Hirono | H02M 1/32 |
| | | | | 318/400.22 |
| 2012/0163046 | A1* | 6/2012 | Hibino | H02P 27/08 |
| | | | | 363/37 |

FOREIGN PATENT DOCUMENTS

| | | |
|---|---|---|
| JP | 4305021 B2 | 7/2009 |
| JP | 2010-022184 A | 1/2010 |
| JP | 2011-072062 A | 4/2011 |

OTHER PUBLICATIONS

"IEEE Guide for AC Motor Protection; IEEE Std C37. 96-2000." XP068050150. Sep. 8, 2000. Piscataway, NJ, USA.
International Search Report of the International Searching Authority dated Jul. 18, 2017 in corresponding international application No. PCT/JP2017/016829 (and English translation).

* cited by examiner

MOTOR CONTROL DEVICE AND AIR CONDITIONER

CROSS REFERENCE TO RELATED APPLICATION

This application is a U.S. national stage application of International Patent Application No. PCT/JP2017/016829 filed on Apr. 27, 2017, the disclosure of which is incorporated herein by reference.

TECHNICAL FIELD

The present invention relates to a motor control device that controls driving of a plurality of motors, and an air conditioner having a motor incorporated therein, the motor being to be controlled by the motor control device.

BACKGROUND

Generally, an inverter is used for controlling the rotation speed and the position of a permanent magnet synchronous motor (hereinafter, abbreviated as "PM (Permanent Magnet) motor"). This is because it is necessary to apply an alternating-current voltage synchronized with a permanent magnet of a rotor to the motor. Therefore, a basic configuration for controlling a PM motor uses one inverter for one PM motor. With this configuration, when a plurality of motors are provided in an air conditioner, the same number of inverters as the number of the motors are required, which results in a cause of increasing the size and cost of the air conditioner.

In such a technical background described above, although the problem to be solved is different, Patent Literature 1 listed below discloses an electric device and a motor driving method in which one induction motor (hereinafter, abbreviated as "IM" (Induction Motor)) and one PM motor are driven by one inverter.

Patent Literature

Japanese Patent No. 4305021

According to Patent Literature 1 described above, it has a configuration in which a PM motor is controlled by using a rotation sensor for the PM motor. It is necessary to use a position sensor for the PM motor. Therefore, a device having a PM motor incorporated therein becomes larger in size and its cost becomes high. Further, in application in which a device with a PM motor is installed outdoors such as an outdoor unit of an air conditioner, water resistance has to be ensured. Therefore, the motor itself becomes larger in size and its cost becomes high.

Meanwhile, there is a control method that does not use any position sensor. The control method that does not use a position sensor is generally called "position sensor-less control". The position sensor-less control follows, as referred to in its name, a control method of estimating a rotational position of a motor from a motor current without incorporating a position sensor in the motor. The position sensor-less control is used regardless of whether the motor is a PM motor or an IM.

The position sensor-less control requires a current sensor that detects a motor current. In a case where two or more motors are controlled by one inverter, it is generally necessary to provide the same number of current sensors as the number of the motors. As a specific example is described, controlling two PM motors by one inverter requires two sets of current sensors. Particularly, when a three-phase motor is controlled, it is necessary to detect currents for at least two phases, and so 2×2=4 current sensors are required. Because generally used current sensors are expensive, position sensor-less control for a device having a three-phase motor incorporated therein leads to a high cost device.

SUMMARY

The present invention has been achieved in view of the above circumstances, and its object is to provide a motor control device to which position sensor-less control can be applied while preventing increase of the size and cost of the device.

In order to solve the above problems and achieve the object, the present invention provides a motor control device comprising: an inverter configured to have a plurality of arms; a direct-current power source to supply a direct-current voltage to the inverter; a shunt resistor inserted between a lower-arm switching element for each phase of the inverter and a negative-electrode side of the direct-current power source; a current sensor to output a voltage according to an electric current flowing in n−1 motors of n motors connected to the inverter in parallel; and a computing unit to generate driving signals for a plurality of switching elements based on an output of the current sensor and an output according to a voltage drop on the shunt resistor, wherein the n is an integer equal to or larger than 2.

According to the present invention, there is an advantageous effect that position sensor-less control can be applied to a motor control device while preventing increase of the size and cost of the device.

DETAILED DESCRIPTION

A motor control device and an air conditioner according to embodiments of the present invention will be described in detail below with reference to the drawings. The present invention is not necessarily limited by these embodiments.

First Embodiment

Figure 1:
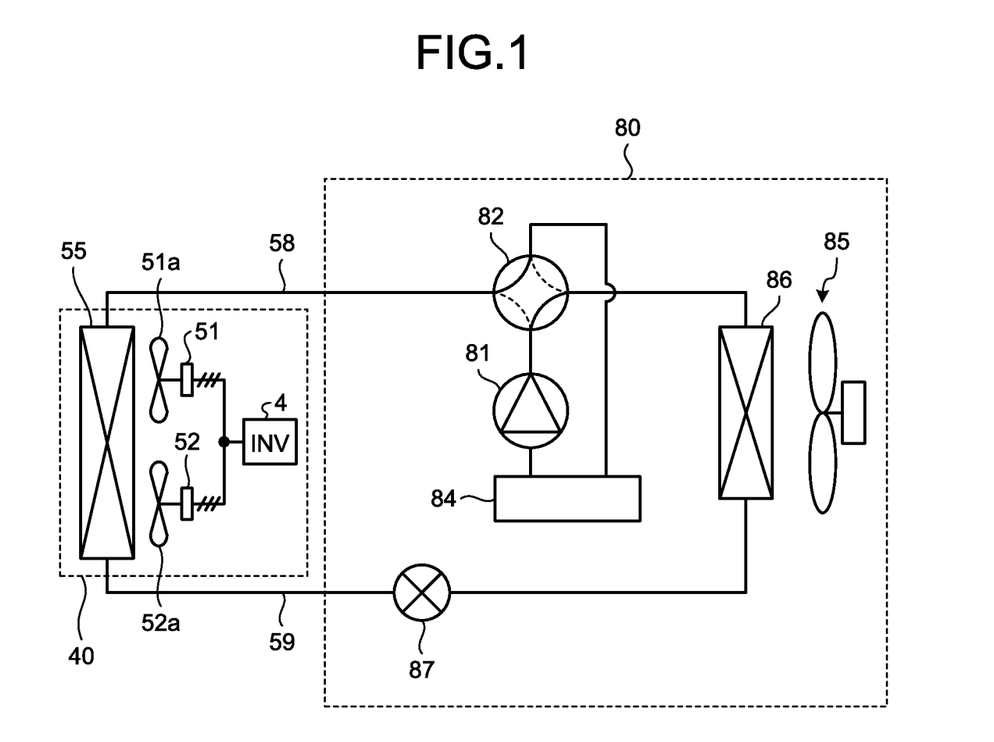
FIG. 1 is a diagram illustrating a configuration example of an air conditioner according to a first embodiment.

FIG. 1 is a diagram illustrating a configuration example of an air conditioner according to a first embodiment. As illustrated in FIG. 1, the air conditioner according to the first embodiment includes an indoor unit 40, an outdoor unit 80, a gas refrigerant pipe 58 and a liquid refrigerant pipe 59 that connect the indoor unit 40 and the outdoor unit 80 to each other, and a throttling device 87.

The outdoor unit 80 includes a compressor 81 that compresses and discharges a refrigerant. A four-way valve 82, an outdoor heat exchanger 86, and the throttling device 87 are connected to a discharge side of the compressor 81 in this order by piping to configure a portion of a refrigerant circuit, where the four-way valve 82 is a channel changing unit that changes a flow channel of a refrigerant. The four-way valve 82 and an accumulator 84 are connected on an intake side of the compressor 81 in this order by piping. The four-way valve 82 is connected to the gas refrigerant pipe 58. An outdoor-unit fan 85 is provided near the outdoor heat exchanger 86.

The outdoor heat exchanger 86 is configured by a tube-type heat exchanger that is formed by, for example, a heat transfer tube and a number of fins, and serves as a condenser during a cooling operation and as an evaporator during a heating operation. The outdoor-unit fan 85 is driven by a fan motor (not illustrated), and is configured to allow an air flow quantity thereof to be adjusted by changing a motor speed, so that a blasted volume can be adjusted.

The throttling device 87 is configured by, for example, an electronic expansion valve whose opening is set to adjust a flow rate of a refrigerant to function as a pressure reducing valve and an expansion valve, to thereby reduce the pressure of the refrigerant and expand the refrigerant. While FIG. 1 exemplifies a case where the throttling device 87 is provided in the outdoor unit 80, there is also a case where the throttling device 87 is provided in the indoor unit 40.

The indoor unit 40 includes an indoor heat exchanger 55, first and second indoor-unit fans (51a, 52a), first and second motors (51, 52) for driving the first and second indoor-unit fans (51a, 52a), respectively, and an inverter 4 that applies an alternating-current voltage to the first and second motors (51, 52). As the first and second motors (51, 52), it is suitable to use a PM motor that has a high induced voltage constant and a high efficiency.

The indoor heat exchanger 55 is connected between the gas refrigerant pipe 58 and the liquid refrigerant pipe 59 and forms a refrigerant circuit for an air conditioner with a refrigerant circuit of the outdoor unit 80. The indoor heat exchanger 55 is configured by a tube-type heat exchanger formed by, for example, a heat transfer tube and a number of fins, and serves as an evaporator during a cooling operation and as a condenser during a heating operation.

The first and second indoor-unit fans (51a, 52a) send air having been subjected to heat exchange by the indoor heat exchanger 55 to an indoor space to be air-conditioned. The first and second motors (51, 52) drive the first and second indoor-unit fans (51a, 52a) individually. The inverter 4 drives both the first and second motors (51, 52), and changes the motor speeds to thereby adjust the blast volume to be sent from the first and second indoor-unit fans (51a, 52a).

While FIG. 1 illustrates a configuration including two indoor-unit fans, a configuration including three or more indoor-unit fans is also along the gist of the present invention.

Figure 2:
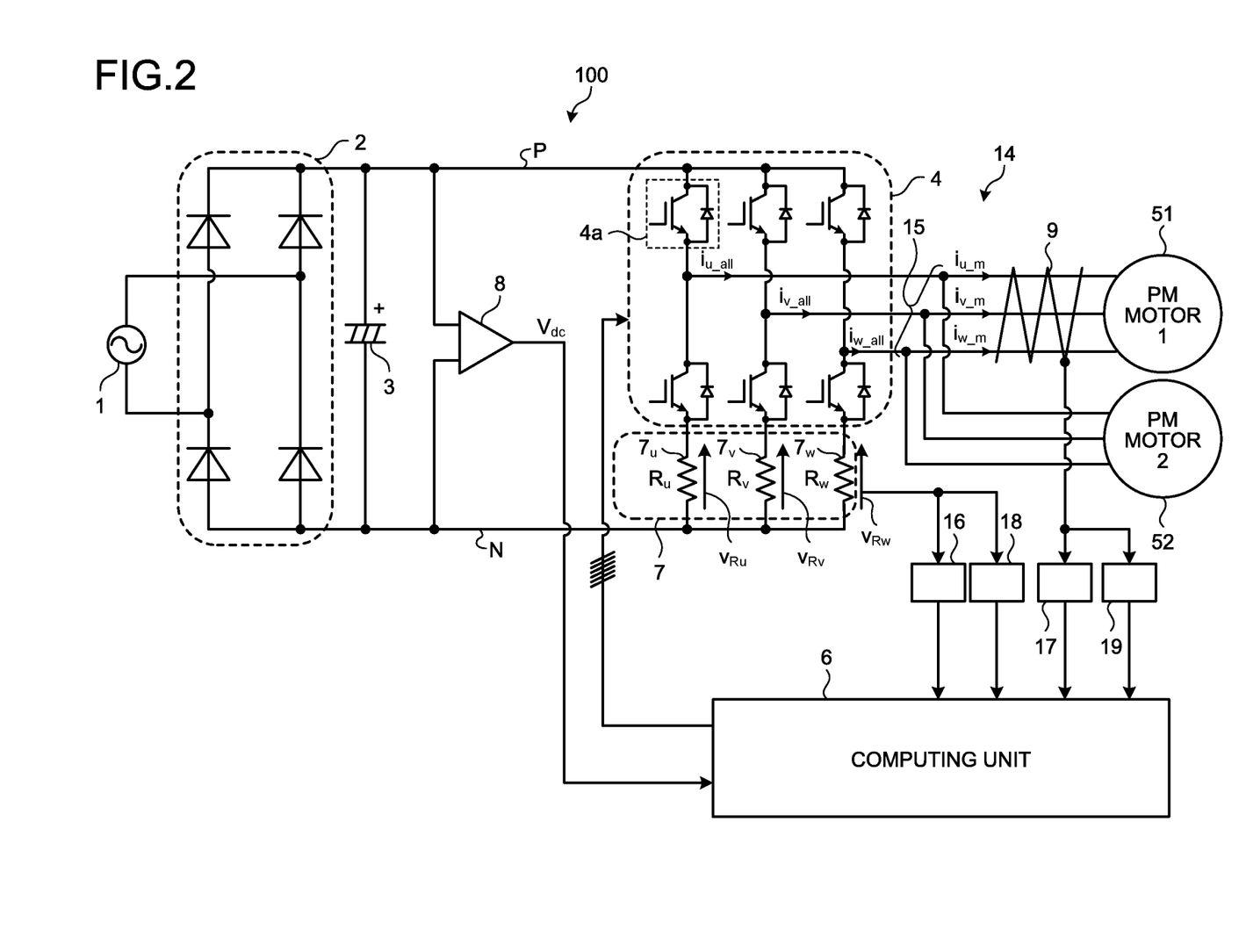
FIG. 2 is a diagram illustrating a configuration example of a motor control device provided in an indoor unit in the first embodiment and peripheral circuits thereof.

FIG. 2 is a diagram illustrating a configuration example of a motor control device provided in an indoor unit according to the first embodiment and peripheral circuits thereof. In FIG. 2, the first motor 51 is expressed as "PM motor 1", and the second motor 52 is expressed as "PM motor 2".

As illustrated in FIG. 2, a motor control device 100 includes the inverter 4 configured by a plurality of arms 4a and a smoothing means 3 that is a direct-current power source supplying a direct-current voltage to the inverter 4. An example of the smoothing means 3 is a capacitor. The inverter 4 is connected to an output side of the smoothing means 3 in parallel. The arm 4a includes a switching element and a diode connected to the switching element in anti-parallel connection. Although an example of the switching element is an IGBT illustrated in FIG. 2, other types of switching elements may be also used. An example of the other type of switching element is a MOSFET.

A rectifier 2 is connected to an input side of the smoothing means 3 in parallel. Alternating-current power from an alternating-current power source 1 is supplied to the rectifier 2. The alternating-current power from the alternating-current power source 1 is smoothed by the smoothing means 3 after being rectified by the rectifier 2, and the smoothed direct-current power is supplied to the inverter 4.

The inverter 4 includes legs for three phases, that is, three legs each including an upper-arm switching element, a lower-arm switching element, and a shunt resistor connected in series in this order. The three legs constitute a U-phase leg, a V-phase leg, and a W-phase leg, respectively. In FIG. 2, the shunt resistor for the U-phase leg is denoted by "$7_u$", the shunt resistor for the V-phase leg is denoted by "$7_v$", and the shunt resistor for the W-phase leg is denoted by "$7_w$". "$R_u$" represents a resistance value of the shunt resistor $7_u$. Similarly, "$R_v$" represents a resistance value of the shunt resistor $7_v$, and "$R_w$" represents a resistance value of the shunt resistor $7_w$.

The U-phase leg, the V-phase leg, and the W-phase leg are connected in parallel to one another between a P-line and an N-line that are direct-current bus lines to which direct-current power is supplied. With this connection, a configuration is formed in which the shunt resistor $7_u$, $7_v$, and $7_w$ of the phase legs are inserted between the lower-arm switching elements for the phases and a negative-electrode side of the smoothing means 3.

A power line 14 is led out from a connection point between the upper-arm switching element and the lower-arm switching element. Each power line 14 branches at a branching point 15 into two paths which are connected to the first motor 51 and the second motor 52, respectively.

Direct-current power smoothed by the smoothing means 3 is supplied to the inverter 4, and is then converted into any three-phase alternating-current power by the inverter 4. The resultant converted three-phase alternating-current power is supplied to the first motor 51 and the second motor 52.

Next, a sensor required for computation of control for the inverter 4 is described. In the following descriptions relevant to control, from the viewpoint of understandability of descriptions, the first motor 51 may be referred to as "master motor" and the second motor 52 may be referred to as "slave motor" in some cases.

A circuit formed by the shunt resistor $7_u$, the shunt resistor $7_v$, and the shunt resistor $7_w$ serves as a detection circuit configured to detect a current flowing through the inverter 4. This detection circuit is referred to as "inverter current sensor 7" in the following descriptions. Further, a master motor current sensor 9 that detects an electric current flowing in the master motor is disposed between the branching point 15 of the power line 14 and the first motor 51 that is the master motor. Furthermore, a bus-voltage sensor 8 that detects a direct-current bus voltage $V_{dc}$ is provided between the P-line and the N-line that are direct-current bus lines.

A computing unit 6 performs motor control computation based on outputs of the inverter current sensor 7, the master motor current sensor 9, and the bus-voltage sensor 8 to generate a driving signal for each switching element of the inverter 4.

Figure 3:
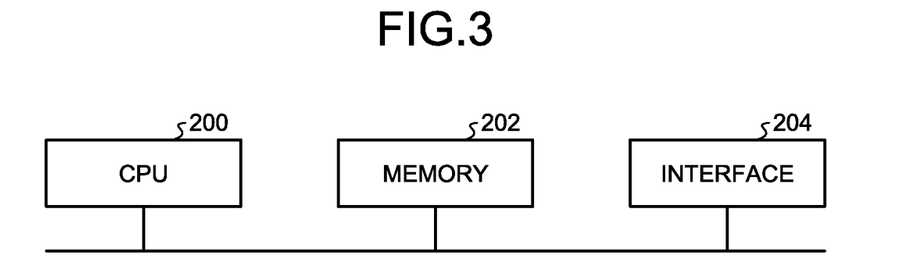
FIG. 3 is a block diagram illustrating an example of a hardware configuration for realizing functions of a computing unit in FIG. 2.

FIG. 3 is a block diagram illustrating an example of a hardware configuration by which functions of the computing unit 6 in FIG. 2 are realized. When realizing the functions for motor control computation of the computing unit 6 described below, as illustrated in FIG. 3, it is possible to employ a configuration including a CPU (Central Processing Unit) 200 that performs computation, a memory 202 that stores therein a program to be read by the CPU 200, and an interface 204 that inputs and outputs signals.

The CPU 200 may be a computing unit such as a microprocessor, a microcomputer, a processor, or a DSP (Digital Signal Processor). The memory 202 corresponds to a nonvolatile or volatile semiconductor memory such as a RAM (Random Access Memory), a ROM (Read Only Memory), a flash memory, an EPROM (Erasable Programmable ROM), or an EEPROM (Electrically EPROM).

Specifically, a program for carrying out the functions for the motor control computation of the computing unit 6 is stored in the memory 202. The CPU 200 sends and receives required information via the interface 204. The program developed in the CPU 200 carries out the motor control computation described below, thereby making it possible to control operations of the master motor and the slave motor.

While FIG. 2 illustrates a configuration including two motors, three or more motors may be included therein. In this case, assuming that the number of motors is n (n is an integer equal to or larger than 2), current sensors each directly detecting a motor current are provided for n−1 motors, and a current flowing in the one remaining motor can be obtained by computation based on detection values of the n−1 current sensors and a detection value of the inverter current sensor. When the motor for which the current sensor that directly detects the motor current is provided is defined as a master motor and the motor of which the motor current is obtained by the computation is defined as a slave motor, what is obtained is a configuration including n−1 master motors and one slave motor.

Although the number of inverters is one in FIG. 2, two or more inverters may be provided. In the case of a configuration including a plurality of inverters, when the number of motors connected to one inverter is m, it suffices that m−1 master motors and one slave motor are provided for the one inverter.

Figure 4:
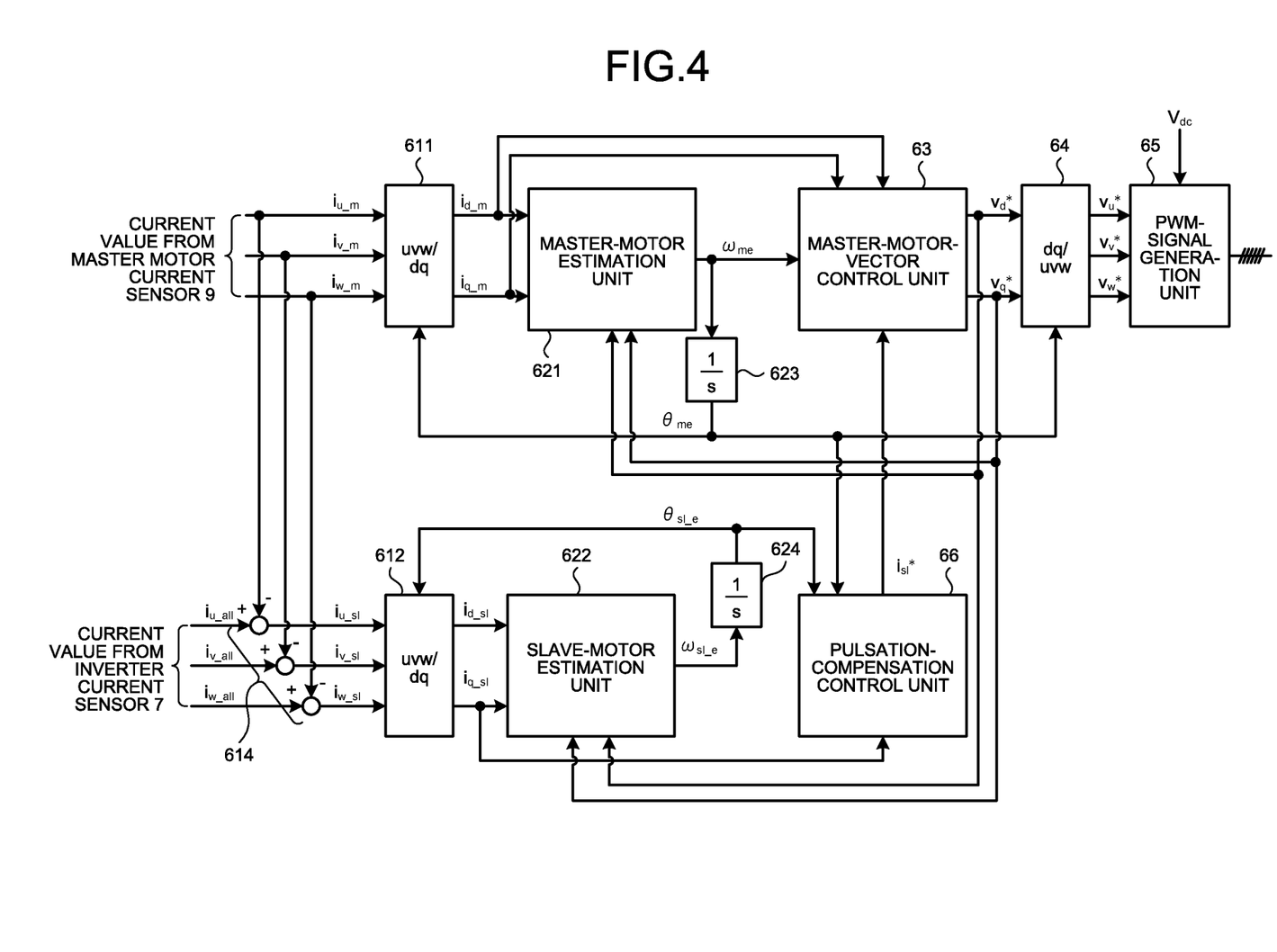
FIG. 4 is a block diagram illustrating a configuration example of motor control computation formed in the computing unit in FIG. 2.

Next, motor control computation performed by the computing unit 6, which is one of the points of the present invention, is described with reference to FIGS. 2 and 4. FIG. 4 is a block diagram illustrating a configuration example of motor control computation established in the computing unit 6 in FIG. 2.

The computing unit 6 includes coordinate transformation units (denoted as "uvw/dq" in FIG. 4) 611 and 612. Master motor currents $i_{u\_m}$, $i_{v\_m}$, and $i_{w\_m}$ that are current values in a stationary three-phase coordinate system detected by the master motor current sensor 9 are inputted to the coordinate transformation unit 611. The coordinate transformation unit 611 converts the master motor currents $i_{u\_m}$, $i_{v\_m}$, and $i_{w\_m}$ to master-motor dq-axis currents $i_{d\_m}$ and $i_{q\_m}$ that are current values in a rotatory two-phase coordinate system in the master motor. The master-motor dq-axis currents $i_{d\_m}$ and $i_{q\_m}$ obtained by the conversion of the coordinate transformation unit 611 are outputted to a master-motor estimation unit 621 and a master-motor-vector control unit 63.

At a preceding stage of the coordinate transformation unit 612, calculation is performed to obtain differences between the master motor currents $i_{u\_m}$, $i_{v\_m}$, and $i_{w\_m}$ and inverter currents $i_{u\_all}$, $i_{v\_all}$, and $i_{w\_all}$ that are current values in a stationary three-phase coordinate system in the inverter 4 detected by the inverter current sensor 7 by difference operators 614, respectively. While the details thereof are described later, outputs of the difference operators 614 are used as slave motor currents $i_{u\_sl}$, $i_{v\_sl}$, and $i_{w\_sl}$ that are current values in a stationary three-phase coordinate system in a slave motor. The coordinate transformation unit 612 converts the slave motor currents $i_{u\_sl}$, $i_{v\_sl}$, and $i_{w\_sl}$ to slave-motor dq-axis currents $i_{d\_sl}$ and $i_{q\_sl}$ that are current values in a rotatory two-phase coordinate system in the slave motor. The slave-motor dq-axis currents $i_{d\_sl}$ and $i_{q\_sl}$ obtained by the conversion of the coordinate transformation unit 612 are outputted to a slave-motor estimation unit 622. Further, the slave-motor q-axis current $i_{q\_sl}$ of the slave-motor dq-axis currents $i_{d\_sl}$ and $i_{q\_sl}$ obtained by the conversion of the coordinate transformation unit 612 is outputted to a pulsation-compensation control unit 66.

The master-motor estimation unit 621 estimates a master-motor-speed estimated value $\omega_{me}$ based on the master-motor dq-axis currents $i_{d\_m}$ and $i_{q\_m}$. An integrator 623 integrates the master-motor-speed estimated value $\omega_{me}$ to calculate a master-motor-phase estimated value $\theta_{me}$. The calculated master-motor-phase estimated value $\theta_{me}$ is inputted to the coordinate transformation unit 611, a coordinate transformation unit 64, and the pulsation-compensation control unit 66 for coordinate transformation of current values and control of pulsation compensation that will be described later.

Further, the slave-motor estimation unit 622 estimates a slave-motor-speed estimated value $\omega_{sl\_e}$ based on the slave-motor dq-axis currents $i_{d\_sl}$ and $i_{q\_sl}$. An integrator 624 integrates the slave-motor-speed estimated value $\omega_{sl\_e}$ to calculate a slave-motor-phase estimated value $\theta_{sl\_e}$. The calculated slave-motor-phase estimated value $\theta_{sl\_e}$ is inputted to the coordinate transformation unit 612 and the pulsation-compensation control unit 66 for coordinate transformation of current values and control of pulsation compensation that will be described later.

If the pulsation-compensation control unit 66 is not included, dq-axis voltage command values $v_d^*$ and $v_q^*$ are calculated in the master-motor-vector control unit 63 based on the master-motor dq-axis currents $i_{d\_m}$ and $i_{q\_m}$ and the master-motor-speed estimated value $\omega_{me}$. Further, voltage command values $v_u^*$, $v_v^*$, and $v_w$ in a stationary three-phase coordinate system are calculated in the coordinate transformation unit 64 based on the dq-axis voltage command values $v_d^*$ and $v_q^*$. A PWM signal for performing PWM (Pulse Width Modulation) control on a switching element of the inverter 4 is generated in a PWM-signal generation unit 65 based on the voltage command values $v_u^*$, $v_v^*$, and $v_w^*$ and the direct-current bus voltage $V_{dc}$.

Figure 5:
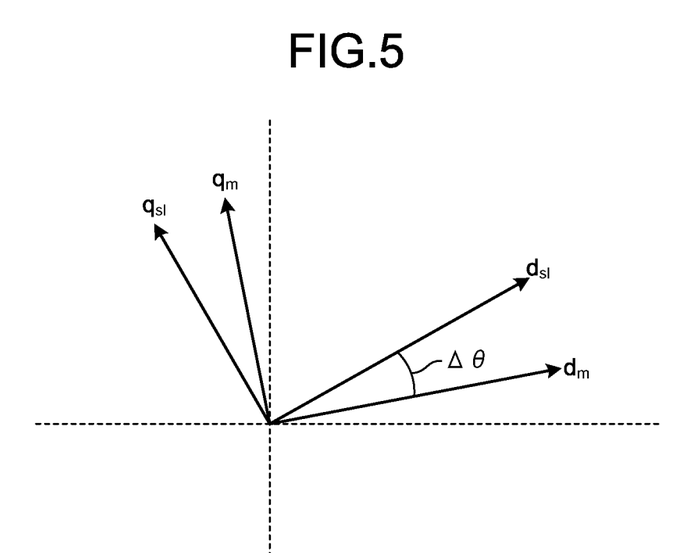
FIG. 5 is a diagram illustrating a control state where an axial error is caused between a master-motor dq-axis current and a slave-motor dq-axis current.

Here, when only the contents of the control described above are performed, that is, only the contents of the control in a case where the pulsation-compensation control unit 66 is not used are performed, the slave motor is only driven in association with a voltage command value calculated with reference to the master motor. The driving state at this time can be represented as illustrated in FIG. 5. FIG. 5 illustrates a control state where an axial error Δθ is caused between the master-motor dq-axis currents $i_{d\_m}$ and $i_{q\_m}$ and the slave-motor dq-axis currents $i_{d\_sl}$ and $i_{q\_sl}$.

There is sometimes a case where an electric current of the slave motor is pulsated in a low-speed region in the control state where some axial error $\Delta\theta$ is caused between the master-motor dq-axis currents $i_{d\_m}$ and $i_{q\_m}$ and the slave-motor dq-axis currents $i_{d\_sl}$ and $i_{q\_sl}$. In order to eliminate or to limit this pulsation, the pulsation-compensation control unit 66 is provided in the first embodiment. The pulsation-compensation control unit 66 generates a pulsation-compensation-current command value $i_{sl}^*$ based on the master-motor-phase estimated value $\theta_{me}$, the slave-motor-phase estimated value $\theta_{sl\_e}$, and the slave-motor q-axis current $i_{q\_sl}$. By using information on the master-motor-phase estimated value $\theta_{me}$ and the slave-motor-phase estimated value $\theta_{sl\_e}$, it is possible to acknowledge the axial error $\Delta\theta$ illustrated in FIG. 5. Therefore, pulsation that can occur in a slave motor can be limited by providing the pulsation-compensation-current command value $i_{sl}^*$ generated by the pulsation-compensation control unit 66 to the master-motor-vector control unit 63.

Also as illustrated in FIG. 5, the slave-motor d-axis current $i_{d\_sl}$ and the slave-motor q-axis current $i_{q\_sl}$ are in an orthogonal relation. Therefore, in place of the configuration in FIG. 4 in which the slave-motor q-axis current $i_{q\_sl}$ is inputted to the pulsation-compensation control unit 66, another configuration may be realized such that the slave-motor d-axis current $i_{d\_sl}$ is inputted to the pulsation-compensation control unit 66.

While the control in the computing unit 6 has been described above, the details of vector control and the details of estimation processes and pulsation-compensation control for master and slave motors are not directly relevant to the main points of the present invention. Therefore, further descriptions thereof are omitted. Note that, as for the control configuration in the computing unit 6, the configuration in FIG. 4 is only an example and, without departing from the scope of the present invention, there will be no problem with employing any control method and any control system.

Next, there is described a role of a current sensor that is another main point of the present invention. First, the inverter current sensor 7 that is one of current sensors detects the inverter current $i_{u\_all}$, $i_{v\_all}$, or $i_{w\_all}$ that flows in a phase of the inverter 4. The inverter currents $i_{u\_all}$, $i_{v\_all}$, and $i_{w\_all}$ can be expressed by the following expressions using the resistance values $R_u$, $R_v$, and $R_w$ of the shunt resistors $7_u$, $7_v$, and $7_w$ for the phases according to Ohm's law.

$$i_{u\_all} = -v_{Ru}/R_u \quad (1)$$

$$i_{v\_all} = -v_{Rv}/R_v \quad (2)$$

$$i_{w\_all} = -v_{Rw}/R_w \quad (3)$$

In the above expressions (1) to (3), $v_{Ru}$, $v_{Rv}$, and $v_{Rw}$ represent voltage drops in the shunt resistors $7_u$, $7_v$, and $7_w$ for their respective phases.

In FIG. 2, the direction from the inverter 4 toward the first motor 51 is defined as a direction along a positive polarity of an inverter current. Based on the above expressions (1) to (3), it is possible to calculate the inverter currents $i_{u\_all}$, $i_{v\_all}$, and $i_{w\_all}$ by detecting the voltage drops $v_{Ru}$, $v_{Rv}$, and $v_{Rw}$ on the shunt resistors $7_u$, $7_v$, and $7_w$ for their respective phases.

However, each of the voltage drops $v_{Ru}$, $v_{Rv}$, and $v_{Rw}$ has a polarity that is inverted in accordance with a current polarity. Therefore, in a case of using a microcomputer for the computing unit 6, it is necessary to take measures to prevent application of a negative voltage to the microcomputer which may cause the microcomputer to be broken. For this reason, a level-shift circuit 16 is provided in the configuration in FIG. 2. However, calculation performed by the level-shift circuit 16 is ignored in the above expressions (1) to (3). Although a phase in which a current can be detected is changed depending on a switching pattern of the inverter 4 as is well known, this change is not described here because it is not directly relevant to the gist of the present invention.

Next, a role of the master motor current sensor 9 that is another one of the current sensors is described. The master motor current sensor 9 is assumed to be a current sensor such as a DCCT or an ACCT. It depends on a switching pattern of the inverter 4 whether the inverter current sensor 7 can detect a current, whereas it does not depend on the switching pattern of the inverter 4 whether the master motor current sensor 9 can detect a current. Although an ACCT has a characteristic that it cannot detect a direct-current component, this characteristic is not described here because whether a direct-current component can be detected is not directly relevant to the gist of the present invention.

In FIG. 2, a detection value of the master motor current sensor 9 is inputted to the computing unit 6 via a level-shift circuit 17. Specifically, the level-shift circuit 17 converts the master motor currents $i_{u\_m}$, $i_{v\_m}$, and $i_{w\_m}$ that are detection values of the master motor current sensor 9 to voltage values, and outputs the voltage values to the computing unit 6. The computing unit 6 can obtain a master motor current by performing AD conversion of the output voltage of the level-shift circuit 17.

It can be said based on the circuit diagram of FIG. 2 that the master motor currents $i_{u\_m}$, $i_{v\_m}$, and $i_{w\_m}$ and the inverter currents $i_{u\_all}$, $i_{v\_all}$, and $i_{w\_all}$ have relations expressed by the following expressions (4) to (6).

$$i_{u\_sl} = i_{u\_all} - i_{u\_m} \quad (4)$$

$$i_{v\_sl} = i_{v\_all} - i_{v\_m} \quad (5)$$

$$i_{w\_sl} = i_{w\_all} - i_{w\_m} \quad (6)$$

In the above expressions (4) to (6), $i_{u\_sl}$, $i_{v\_sl}$, and $i_{w\_sl}$ in the left sides represent slave motor currents flowing in a slave motor.

Therefore, the slave motor current can be calculated using the above expressions (4) to (6). Accordingly, it is not necessary to provide a current sensor for a slave motor. The control configuration in FIG. 2 is a configuration in which current detection is performed based on a shunt resistor, and so it is less expensive as compared with a case of using a DCCT that uses a Hall IC and a case of using an ACCT that uses a transformer. Further, a resistor component used for the shunt resistor is more compact than an ACCT or a DCCT, and therefore it is also suitable for downsizing of the entire device.

In the above descriptions, a relation between control computation and current sensors has been described. Next, a relation between overcurrent protection and current sensors is described.

Generally, if a failure such as stepping out of a motor or short-circuiting between upper and lower arms in an inverter occurs, overcurrent protection is activated. When overcurrent protection is activated, a sudden current flow to the inverter and the motor is caused. Therefore, a quick protecting operation is required and thus overcurrent protection is generally performed by a configuration based on hardware using an electronic circuit.

In the case of FIG. 2, overcurrent protection against a current flowing in the inverter 4 is implemented using an inverter-overcurrent detection circuit 18. Further, in the case of FIG. 2, overcurrent protection against a current flowing in a master motor is implemented using a master-motor-overcurrent detection circuit 19. There are various configurations for an overcurrent detection circuit, and any of circuit configurations may be applied when the overcurrent detection circuit is applied to the present invention.

Meanwhile, as described above, in the first embodiment, a current sensor for directly detecting a current flowing in a slave motor is not provided. For this reason, it is difficult to implement overcurrent protection against the current flowing in the slave motor with hardware. Therefore, in the first embodiment, overcurrent detection is performed with software processing in the computing unit 6.

Figure 6:
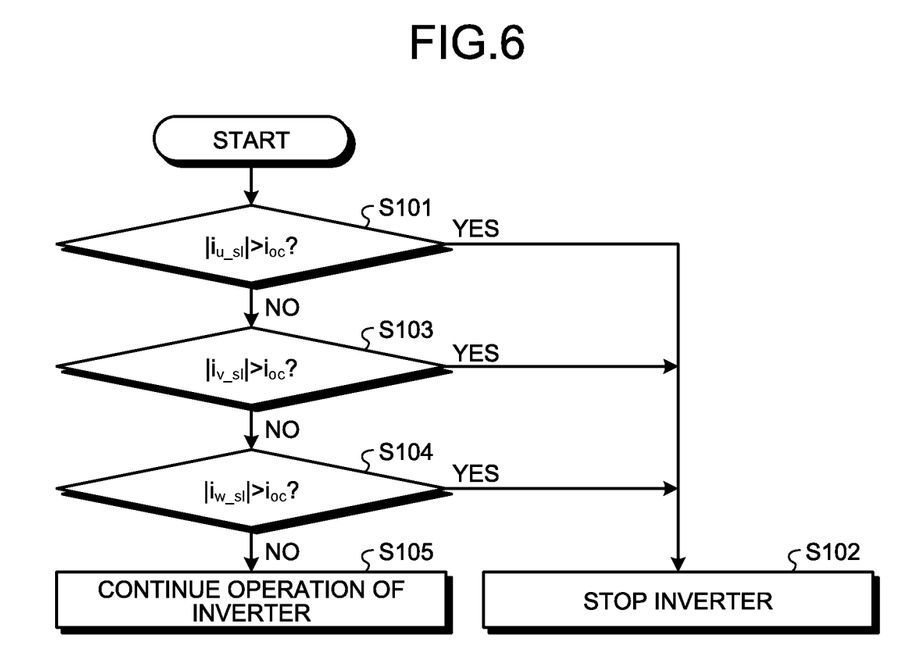
FIG. 6 is a flowchart illustrating a flow of overcurrent detection implemented by a computing unit in FIG. 2.

FIG. 6 is a flowchart illustrating a flow of overcurrent detection implemented by the computing unit 6 in FIG. 2. In FIG. 6, "$i_{oc}$" represents a determination value of an overcurrent. In FIG. 6, at Step S101, an absolute value of the U-phase slave motor current $i_{u\_sl}$ calculated using the above expression (4) is compared with the determination value $i_{oc}$. If the absolute value of the slave motor current $i_{u\_sl}$ is larger than the determination value $i_{oc}$ (YES at Step S101), the process makes transition to Step S102, and an operation of the inverter 4 is stopped. On the other hand, if the absolute value of the slave motor current $i_{u\_sl}$ is equal to or smaller than the determination value $i_{oc}$ (NO at Step S101), the process makes transition to Step S103.

At Step S103, an absolute value of the V-phase slave motor current $i_{v\_sl}$ calculated using the above expression (5) is compared with the determination value $i_{oc}$. If the absolute value of the slave motor current $i_{v\_sl}$ is larger than the determination value $i_{oc}$ (YES at Step S103), the process makes transition to Step S102, and the operation of the inverter 4 is stopped. On the other hand, if the absolute value of the slave motor current $i_{v\_sl}$ is equal to or smaller than the determination value $i_{oc}$ (NO at Step S103), the process makes transition to Step S104.

At Step S104, an absolute value of the W-phase slave motor current $i_{w\_sl}$ calculated using the above expression (6) is compared with the determination value $i_{oc}$. If the absolute value of the slave motor current $i_{w\_sl}$ is larger than the determination value $i_{oc}$ (YES at Step S104), the process makes transition to Step S102, and the operation of the inverter 4 is stopped. On the other hand, if the absolute value of the slave motor current $i_{w\_sl}$ is equal to or smaller than the determination value $i_{oc}$ (NO at Step S104), the process makes transition to Step S105, and the operation of the inverter 4 continues.

The matters described above are processes of overcurrent protection for a slave motor. The point of the processes is that the operation of the inverter 4 is stopped when one of absolute values of slave motor currents for the phases exceeds a determination value, but inverter operation is caused to continue when all the absolute values of the slave motor currents for the phases do not exceed the determination value. By performing these processes, it is possible to perform overcurrent protection for the slave motor.

In the flow in FIG. 6 described above, determination of an overcurrent is performed for a U-phase, a V-phase, and a W-phase in this order, but this order is merely an example, and any one of the phases may be subjected to determination of an overcurrent first.

When the absolute value of the slave motor current $i_{u\_sl}$ and the determination value $i_{oc}$ are equal to each other, the determination result is "No" at Step S101 described above. However, the determination result may be "Yes" in that case. That is, the operation of the inverter 4 may be stopped when the absolute value of the slave motor current $i_{u\_sl}$ is equal to the determination value $i_{oc}$.

Similarly, when the absolute value of the slave motor current $i_{v\_sl}$ and the determination value $i_{oc}$ are equal to each other, the determination result is "No" at Step S103 described above. However, the determination result may be "Yes" in that case. That is, the operation of the inverter 4 may be stopped when the absolute value of the slave motor current $i_{v\_sl}$ is equal to the determination value $i_{oc}$.

Similarly, when the absolute value of the slave motor current $i_{w\_sl}$ and the determination value $i_{oc}$ are equal to each other, the determination result is "No" at Step S104 described above. However, the determination result may be "Yes" in that case. That is, the operation of the inverter 4 may be stopped when the absolute value of the slave motor current $i_{w\_sl}$ is equal to the determination value $i_{oc}$.

As described above, according to a motor control device of the first embodiment, a master motor current sensor is provided for each of n−1 master motors of n motors connected in parallel to an inverter, and a computing unit generates a driving signal for a switching element based on voltages according to currents flowing in the n−1 master motors and a voltage according to a voltage drop on a shunt resistor, where n is an integer equal to or larger than 2. Therefore, it is possible to detect an electric current of a slave motor by computation using a master motor current, while detecting an inverter current using the shunt resistor.

Second Embodiment

Figure 7:
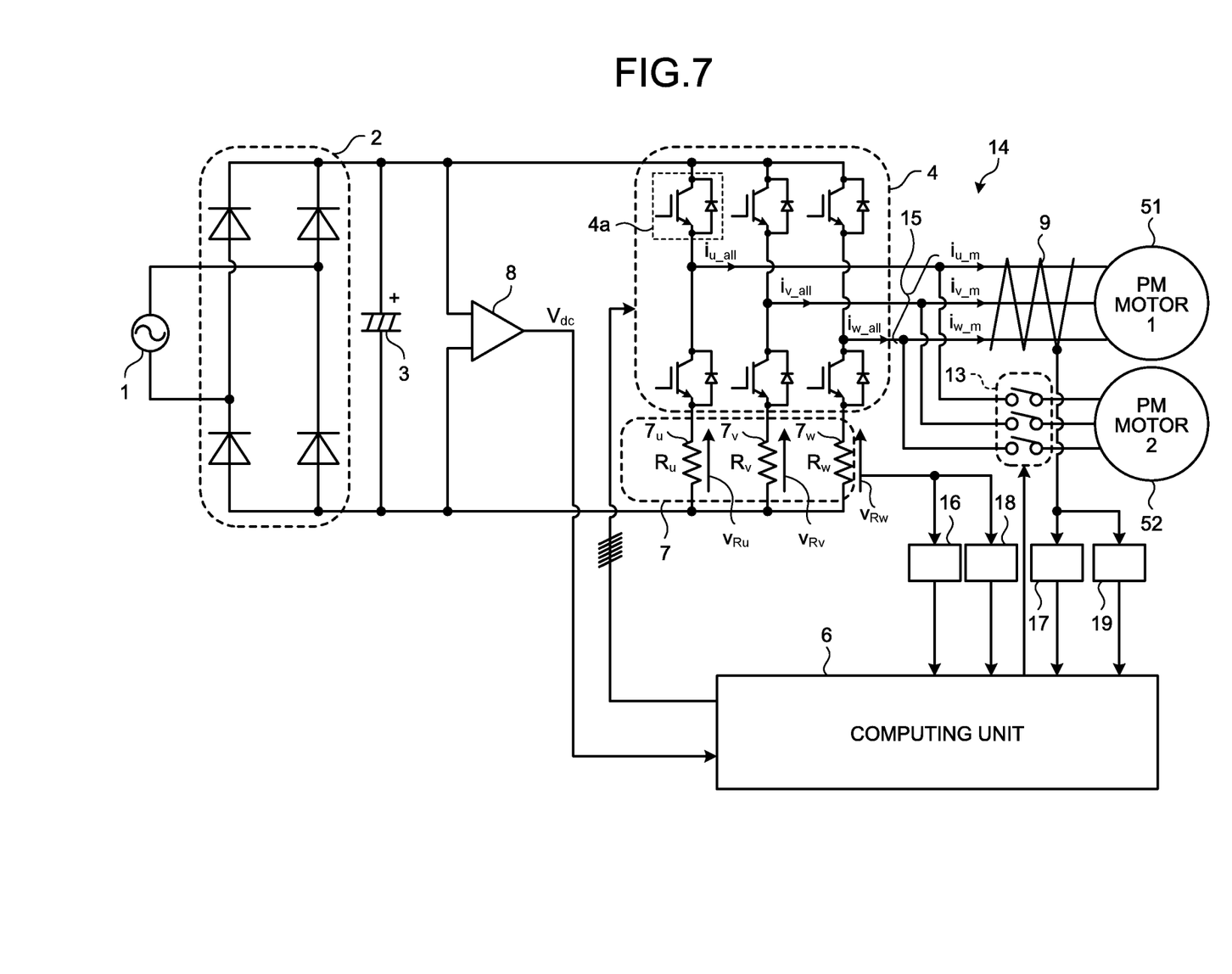
FIG. 7 is a diagram illustrating a configuration example of a motor control device provided in an indoor unit in a second embodiment and peripheral circuits thereof.

FIG. 7 is a diagram illustrating a configuration example of a motor control device provided in an indoor unit according to a second embodiment and peripheral circuits thereof. The second embodiment illustrated in FIG. 7 has a configuration in which a relay 13 is added between the branching points 15 and the second motor 52 in the configuration of the first embodiment illustrated in FIG. 2. Other configurations are identical or equivalent to the configurations of the first embodiment illustrated in FIG. 2, and identical or equivalent constituent parts are denoted by like reference signs to omit redundant explanations thereof.

Figure 8:
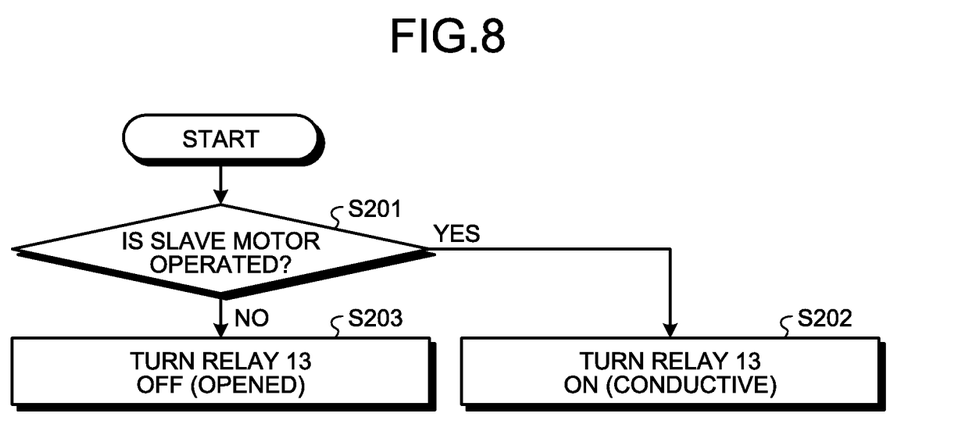
FIG. 8 is a flowchart illustrating an operation flow of a relay in the second embodiment.

FIG. 8 is a flowchart illustrating an operation flow of the relay 13 in the second embodiment. In FIG. 8, at Step S201, it is determined whether or not to operate a slave motor. When the slave motor is operated (YES at Step S201), the process makes transition to Step S202 and the relay 13 is turned ON, that is, the relay 13 is set into a conductive state. On the other hand, when the slave motor is not operated (NO at Step S201), the process makes transition to Step S203 and the relay 13 is turned OFF, that is, the relay 13 is opened.

The matters described above are an operation flow related to the relay 13. The point of the operation is that the relay 13 is in an opened state when a master motor is operated alone, and the relay 13 is set in a conductive state when both the master motor and the slave motor are operated. With this operation, it is possible to change the number of operating motors to any number.

Although FIG. 7 illustrates a configuration in which two motors are provided and the relay 13 is inserted for one master motor, the present embodiment is not limited to this configuration. In a case where the number of motors is n (n is an integer equal to or larger than 2) and a master motor current sensor 9 is provided for each of n−1 master motors, it suffices that n−2 relays 13 are inserted between n−2 master motors of the n−1 master motors for which the master motor current sensors 9 are provided and the inverter 4, and the relay 13 is also inserted between a slave motor for which no master motor current sensor 9 is provided and the inverter 4. This configuration enables overcurrent protection described later.

Next, a cutoff value of the inverter-overcurrent detection circuit 18 in the second embodiment is described. As described above, a master motor and an inverter perform overcurrent detection using hardware. In this case, when a determination value for overcurrent detection is fixed, it is preferable to set the determination value obtained while taking the number of driven motors into consideration. Specifically, with regard to the inverter-overcurrent detection circuit 18, it is important to set the determination value $i_{oc}$ so as to satisfy the following expression (7).

$$i_{max\_m} + i_{max\_sl} < i_{oc} < i_{oc\_m} + i_{oc\_sl} \qquad (7)$$

In the above expression (7), $i_{max\_m}$ represents a maximum driving current of the master motor, $i_{max\_sl}$ represents a maximum driving current of the slave motor, $i_{oc\_m}$ represents an overcurrent cutoff value for the master motor, and $i_{oc\_sl}$ represents an overcurrent determination value for the slave motor.

By making the setting as in the above expression (7), it is possible to prevent erroneous overcurrent protection when the master motor and the slave motor are simultaneously driven, and is also possible to ensure reliable protection when an overcurrent state occurs.

When only a single master motor is driven, that is, when the relay 13 is opened, the current flowing in the inverter 4 is only a current of the master motor. In general, a relation between the maximum driving current $i_{max\_m}$ of the master motor and the overcurrent cutoff value $i_{oc\_m}$ is expressed by the following expression (8).

$$i_{max\_m} < i_{oc\_m} \qquad (8)$$

Therefore, at the time of operating one master motor alone, overcurrent protection cannot be performed by only the inverter-overcurrent detection circuit 18. Therefore, it is possible to perform software overcurrent protection using the computing unit 6 even if an overcurrent detection circuit is not provided for a slave motor to which the relay 13 is connected as illustrated in FIG. 7, whereas it is necessary to provide, on a master motor side, an overcurrent detection circuit formed by hardware like the master-motor-overcurrent detection circuit 19.

As described above, according to the motor control device of the second embodiment, a function of performing overcurrent detection in accordance with a voltage drop on a shunt resistor and a function of performing overcurrent detection in accordance with an output voltage of a master motor current sensor are additionally provided. Therefore, it is possible to cut off an overcurrent in an appropriate manner while switching the number of operating motors.

The configurations described in the above embodiments are only examples of the content of the present invention. These configurations can be combined with other publicly known techniques, and partially omitted and/or modified without departing from the scope of the present invention.

The invention claimed is:

1. A motor control device comprising:
    an inverter configured to have a plurality of arms;
    a direct-current power source to supply a direct-current voltage to the inverter;
    a shunt resistor inserted between a lower-arm switching element for each phase of the inverter and a negative-electrode side of the direct-current power source;
    a current sensor to output a voltage according to an electric current flowing in n−1 motors of n motors connected to the inverter in parallel; and
    a computing unit to generate driving signals for a plurality of switching elements based on an output of the current sensor and an output according to a voltage drop on the shunt resistor,
    wherein the n is an integer equal to or larger than 2.

2. The motor control device according to claim 1, comprising:
    an inverter-overcurrent detection unit to perform overcurrent detection in accordance with a voltage drop on the shunt resistor; and
    a motor-overcurrent detection unit to perform overcurrent detection in accordance with an output voltage of the current sensor.

3. The motor control device according to claim 2, comprising:
    n−2 relays inserted between n−2 motors of n−1 motors for which the current sensor is provided and the inverter; and
    a relay inserted between a motor to which the current sensor is not connected and the inverter.

4. The motor control device according to claim 1,
    wherein the computing unit
        calculates an inverter current flowing in the inverter based on a voltage value according to a resistance value of the shunt resistor,
        calculates a motor current flowing in a motor to which the current sensor is connected, based on a voltage value according to an output voltage of the current sensor, and
        calculates a current of a motor to which the current sensor is not connected, by subtracting the motor current from the inverter current, thereby generating the driving signals.

5. The motor control device according to claim 4,
    wherein detection of an overcurrent of a motor to which the current sensor is not connected is performed in accordance with a current calculated by subtracting the motor current from the inverter current.

6. The motor control device according to claim 2,
    wherein the computing unit
        calculates an inverter current flowing in the inverter based on a voltage value according to a resistance value of the shunt resistor,
        calculates a motor current flowing in a motor to which the current sensor is connected, based on a voltage value according to an output voltage of the current sensor, and
        calculates a current of a motor to which the current sensor is not connected, by subtracting the motor current from the inverter current, thereby generating the driving signals.

7. The motor control device according to claim 6,
    wherein detection of an overcurrent of a motor to which the current sensor is not connected is performed in accordance with a current calculated by subtracting the motor current from the inverter current.

8. An air conditioner comprising:
    an indoor unit including indoor unit fans driven by the motor control device according to claim 1; and
    an outdoor unit.

9. The air conditioner according to claim 8,
    wherein the motor control device comprises:

an inverter-overcurrent detection unit to perform overcurrent detection in accordance with a voltage drop on the shunt resistor; and a motor-overcurrent detection unit to perform overcurrent detection in accordance with an output voltage of the current sensor.

10. The air conditioner according to claim 9, wherein the motor control device comprises:

n−2 relays inserted between n−2 motors of n−1 motors for which the current sensor is provided and the inverter; and a relay inserted between a motor to which the current sensor is not connected and the inverter.

11. The air conditioner according to claim 8, wherein the computing unit calculates an inverter current flowing in the inverter based on a voltage value according to a resistance value of the shunt resistor, calculates a motor current flowing in a motor to which the current sensor is connected, based on a voltage value according to an output voltage of the current sensor, and calculates a current of a motor to which the current sensor is not connected, by subtracting the motor current from the inverter current, thereby generating the driving signals.

12. The air conditioner according to claim 9, wherein the computing unit calculates an inverter current flowing in the inverter based on a voltage value according to a resistance value of the shunt resistor, calculates a motor current flowing in a motor to which the current sensor is connected, based on a voltage value according to an output voltage of the current sensor, and calculates a current of a motor to which the current sensor is not connected, by subtracting the motor current from the inverter current, thereby generating the driving signals.

13. The air conditioner according to claim 11, wherein detection of an overcurrent of a motor to which the current sensor is not connected is performed in accordance with a current calculated by subtracting the motor current from the inverter current.

14. The air conditioner according to claim 12, wherein detection of an overcurrent of a motor to which the current sensor is not connected is performed in accordance with a current calculated by subtracting the motor current from the inverter current.

* * * * *